United States Patent Office 2,748,166
Patented May 29, 1956

2,748,166

PRODUCTION OF OXIMES

Heinrich Hopff, Zurich, Switzerland, and Otto von Schickh and Hans-Joachim Riedl, Ludwigshafen (Rhine), Germany, assignors to Badische Anilin- & Soda-Fabrik Aktiengesellschaft, Ludwigshafen (Rhine), Germany No Drawing. Application June 16, 1953, Serial No. 362,125

Claims priority, application Germany July 2, 1952

4 Claims. (Cl. 260—566)

This invention relates to an improved process for the production of oximes by reducing secondary aliphatic or cycloaliphatic nitro compounds.

We have found that oximes are obtained in good yields by reacting secondary aliphatic or cycloaliphatic nitro compounds in the form of their salts or the free acid-forms in acid medium with hyposulfurous acid or its salts.

Suitable nitro compounds are in particular the nitrohydrocarbons, as for example 2-nitro-propane, nitrocyclohexane, nitrocyclo-pentane, methylated nitrocyclohexanes, the secondary nitro-butanes or -hexanes. They are preferably used in the form of their alkali metal, alkaline earth metal or ammonium salts. The hyposulfurous acid is preferably used in the form of its alkali metal or ammonium salts.

The procedure may be for example that aqueous solutions of about equivalent amounts of the salts of the nitro compounds and of hyposulfurous acid, either after previous mixing or separately but simultaneously, are stirred into dilute acids. If desired, indifferent organic solvents or dispersing agents may also be co-employed.

The reaction usually takes place at room temperature very rapidly. The process may also very easily be carried out continuously by allowing the solutions of the salts of the nitro compounds and the hyposulfurous acid to flow together with excess acid, for example in a mixing tube.

If necessary cooling or elevated temperatures may be used.

The reaction mixture must in any case be acid, but the exact pH-value plays no special part. Therefore either an excess of acid is provided from the start or care is taken by periodic or continuous addition of acid that the reaction mixture always remains acid.

The following examples will further illustrate this invention but the invention is not restricted to these examples. The parts are parts by weight.

Example 1

A solution of 105 parts of sodium hyposulfite in 300 parts of water is added to a solution of 64.5 parts of nitrocyclohexane in 235 parts of 9 per cent aqueous caustic soda solution. The mixture is allowed to flow into 900 parts of 2-normal sulfuric acid while stirring vigorously at about 20° C. Even before the whole has been introduced, cyclohexanone oxime commences to crystallize out. The acid reaction mixture, permeated with crystals, is neutralized with sodium carbonate solution and the oxime then filtered off by suction. Further oxime is obtained from the mother liquor by shaking up for example with ether. The total yield amounts to 34 parts, corresponding to about 60 per cent of the theoretical yield.

Example 2

A neutral solution of 105 parts of sodium hyposulfite in 300 parts of water is added to a solution of 71.5 parts of 1-methyl-3-nitro-cyclohexane in 235 parts of 9 per cent aqueous caustic soda solution. The mixture is introduced rapidly while stirring at about 20° C. into 900 parts of 2-normal sulfuric acid. The acid reaction mixture is neutralized with sodium carbonate and then extracted with ether. The ethereal extract is extracted with 2-normal hydrochloric acid; the aqueous layer of that extraction process is again neutralized with sodium carbonate and again extracted with ether. After evaporating the ether, 1-methyl-3-cyclohexanone oxime boiling at 115° C. (15 torr) is obtained.

Example 3

To a solution of 57.5 parts of nitrocyclopentane in 235 parts of 9 per cent aqueous caustic soda solution there is added a neutral solution of 105 parts of sodium hyposulfite in 300 parts of water. The mixture is stirred rapidly at about 20° C. into 900 parts of 2-normal sulfuric acid. By working up in the manner described in Example 2, there is obtained cyclopentanone oxime melting at 56–57° C.

We claim:

1. A process for the production of ketoximes which comprises reducing a member of the group consisting of the alkali metal, alkaline earth metal and ammonium salts of secondary mono-nitro derivatives of saturated aliphatic hydrocarbons containing from 3 to 6 carbon atoms and of cyclopentane, cyclohexane and methyl cyclohexane by means of an about equivalent amount of a water soluble salt of hyposulfurous acid in the presence of excess mineral acid.

2. A process for the production of cyclohexanone oxime which comprises introducing aqueous alkaline solutions of nitrocyclohexane and about equivalent amounts of an alkali salt of hyposulfurous acid into excess mineral acid.

3. A process for the production of cyclopentanone oxime which comprises introducing aqueous alkaline solutions of nitrocyclopentane and about equivalent amounts of an alkali salt of hyposulfurous acid into excess mineral acid.

4. A process for the production of 1-methyl-3-cyclohexanone oxime which comprises introducing aqueous alkaline solutions of 1-methyl-3-nitrocyclohexane and about equivalent amounts of an alkali salt of hyposulfurous acid into excess mineral acid.

References Cited in the file of this patent

Houben: "Die Methoden der Org. Chem.," vol. II (3rd ed.), page 391 (1925), (G. Theime, Leipzig).